S. C. JOHNSON.
ROACH TRAP.
APPLICATION FILED NOV. 25, 1914.

1,161,388. Patented Nov. 23, 1915.

WITNESSES
Jas. K. McCathran
F. T. Chapman

Simon C. Johnson, INVENTOR

BY E. G. Siggers
ATTORNEY

UNITED STATES PATENT OFFICE.

SIMON C. JOHNSON, OF DE KALB, ILLINOIS.

ROACH-TRAP.

1,161,388.

Specification of Letters Patent.

Patented Nov. 23, 1915.

Application filed November 25, 1914. Serial No. 873,977.

*To all whom it may concern:*

Be it known that I, SIMON C. JOHNSON, a citizen of the United States, residing at De Kalb, in the county of Dekalb and State of Illinois, have invented a new and useful Roach-Trap, of which the following is a specification.

This invention has reference to roach traps, and its object is to provide a trap particularly adapted to catching roaches, and also well adapted for catching insects of smaller size, and particularly those of similar habits.

In accordance with the present invention there is provided a trap comprising a body portion adapted to hold a sheet of material covered with an adhesive substance similar to certain types of fly paper, and the body portion is provided with a cover member to overlie the fly paper. This cover portion has numerous perforations each of a size to admit the passage of a roach through it, and surrounding each perforation on what may be termed the inner or under side of the cover, is an irregular collar which may be produced by punching through the metal of the cover, the latter being made of sheet metal, without removing any of such metal. By providing the cover with a blank or unperforated space, a certain portion of the sticky fly paper may be utilized to hold bait hidden from view from the outer surface of the trap, but which bait is attractive to the insects, because hidden. For this reason the insects readily find their way through the perforations, but the collars surrounding the inner edges of the perforations cause the insects to change their course in such manner that many of them are caught on the sticky fly paper by contact of their backs or wing cases with such paper, wherefore the insects are then prevented from escape. The blank portion of the cover overlying the bait space also prevents any chance of the insects finding a safety spot upon the bait from which they may possibly escape.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
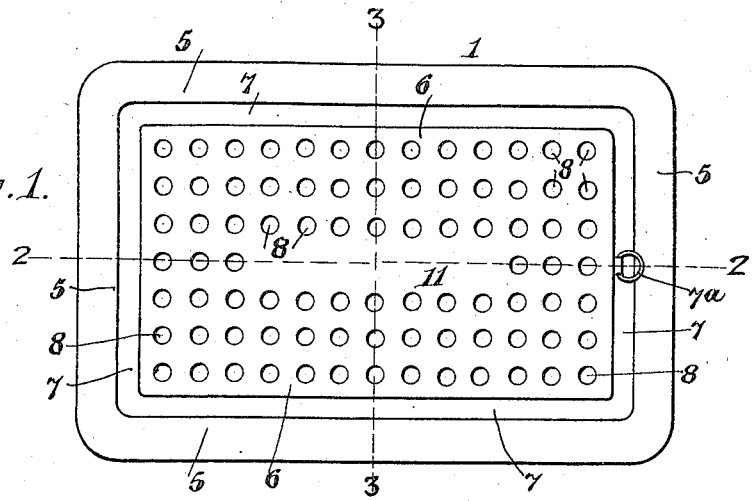
Figure 2:
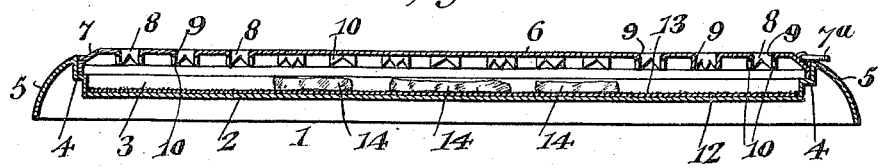
Figure 3:
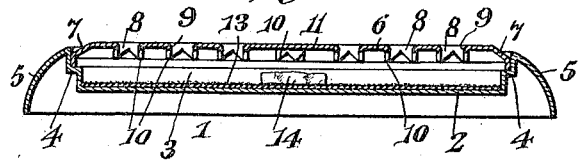
Figure 4:
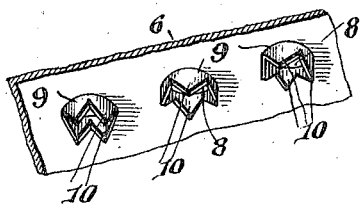

In the drawings:—Figure 1 is a plan view of a trap constructed in accordance with the present invention. Fig. 2 is a section on the line 2—2 of Fig. 1 but drawn on a larger scale. Fig. 3 is a section on the line 3—3 of Fig. 1 and also drawn on a larger scale. Fig. 4 is a perspective view of a fragment of the trap cover as seen from the under side.

Referring to the drawings there is shown a body member 1 which may be conveniently constructed of sheet metal stamped or otherwise shaped into form. This body member comprises a main receptacle 2 with a surrounding border portion 3 terminating in a shouldered ledge 4 surrounded by a marginal rim 5 which may be in the form of a bead of sufficient height to raise the receptacle 2 from contact with a table or other support upon which the trap is placed. It is usual to place the trap upon some horizontal support, such as a table, shelf or the like, where roaches are liable to congregate, and the bead or margin 5 may be so shaped as to render it comparatively easy for the roaches to find their way to the top of the trap.

The receptacle 2 is made of a size to readily receive and hold a sheet of sticky fly paper which in the most prevalent form is of standard size, so that a trap of like standard size will accommodate the sticky fly paper without change of either the trap or the paper.

Normally seated on the ledge 4 is a cover member 6 which may also be conveniently made of sheet metal with a marginal rim 7 adapted to fit in the shouldered ledge 4, resting on the shoulder thereof, and it is usually sufficient that the cover rest by gravity upon the shouldered ledge. The cover is sufficiently extensive to entirely overlie the receptacle 2 and at one end the cover 6 is provided with a manipulating ring $7^a$ so that the cover may be readily removed when desired. Of course, it will be understood that the ring $7^a$ is only indicative of any manipulating member which may be desired.

The cover 6 is pierced by numerous holes 8 each of a size to readily permit the passage of a roach or other insect. Each passage 8 is preferably made by punching through the metal of the cover 6, so that the inner margin of each passage is surrounded by a collar 9 with terminal prongs 10. This collar with its prongs 10 may be quite irregular as would naturally occur by the displacement and tearing of the metal where none of the metal is removed, so that the inner portion of each passage is more or less jagged. The passages 8 may be arranged in a regular series of rows, as indicated, or the passages may be arranged in any way desired but at some point, and preferably at the middle portion of the cover, there is left an unperforated or blank space 11.

In the drawings the receptacle 2 is shown as provided with a sheet 12 of suitable material, such as paper upon one surface 13 of which there is a coating of a suitable sticky or tacky material. The sheet 12 with this coating 13 may consist of a familiar kind of sticky fly paper, such, for instance, as is commercially known as Tanglefoot. With this receptacle 2 of proper size to easily yet snugly receive such a sheet of sticky fly paper, pieces 14 of bait may be attached to the middle portion of the paper, so as to come under the blank space 11, and therefore such bait can only be reached by an insect crawling into the interior of the trap between the cover and the sticky fly paper. In order to do this the insect must also crawl around the jagged collars 9, thus causing the insect to approach closer to the sticky fly paper than would be the case were the collars absent. By properly proportioning the parts the attempt of the insect to crawl around the jagged collar will bring the wings or wing cases, especially with so large an insect as a roach, into engagement with the sticky surface of the fly paper, whereupon the insect is at once caught by the fly paper and there imprisoned without any chance of escape. Should the insect manage to get within the trap without being caught on entrance thereinto, its instincts will of course cause it to seek the bait, which may consist of some pieces of bread thickly covered with fresh lard, which is particularly enticing to roaches, or of raw potatoes, apples, or any other suitable material. On entering the trap through the perforations 8 and in endeavoring to pass about the collars 9 the roaches naturally crawl with their backs downward, and will continue to crawl along the under side of the cover 6 until they are able to reach the bait, unless they should first seek to reach the fly paper before crawling to the bait. In the latter case the insects are, of course, caught at once, and are then unable to escape from the sticky fly paper. If they ultimately reach the bait and feed thereupon they will sooner or later attempt to escape from the trap. While feeding the insects assume the ordinary position with the legs downward and the backs upward, and hence on attempting to find their way out of the trap they naturally move upon the sticky fly paper and are caught, since there is no chance of escape directly above the bait, and there is not room enough for the insect to there turn over should by any chance it attempt to do so, which attempt is not at all likely.

Roaches and other insects of like habits desire dark places, so that with the bait hidden from view and more or less in the shadow should there be any light present, the roaches are more likely to approach the bait than if it were in the full light. Moreover, by compelling the roaches to turn upside-down in order to reach the bait the likelihood of their being caught by the paper before they reach the bait is greatly increased, while the chance of escaping from the trap even should they reach the bait is practically eliminated, since even so strong an insect as a roach is not liable to escape from the sticky surface if once caught therein, and, of course, if caught by the back on the sticky surface, escape is wholly impossible.

The perforations 8 may be made round, as indicated in the drawings, or may be made of any other desired shape, and it is especially valuable to form these perforations by punching through the metal without removing any of the metal.

While the structure has been described as made of metal, and this is the preferred material to be used, it will be understood that it may be made of other materials or may be made in part of metal and in part of other materials. Moreover, while the use of sticky fly paper, and by preference of a special brand of sticky fly paper is mentioned, it will be understood that any substance liable to entangle the insects may be employed.

The body member 1 forms a convenient receptacle for sticky fly paper in which the latter may be located and used for catching flies and the like. For such use the cover is omitted.

What is claimed is:—

1. A roach trap comprising a shallow and substantially flat imperforate receptacle for normally sticky adhesive material, and a substantially flat cover member having passages therethrough with their margins surrounded by projections directed toward and approaching close to the sticky surface, whereby a roach entering the trap through a passage is liable to be caught by the sticky material while still clinging to the projections about the passage.

2. A roach trap provided with a substantially flat imperforate receptacle for normally sticky adhesive material, and a substantially flat sheet metal cover member having passages, of a size to admit roaches, punched through the sheet metal with inner raw edges constituting projections directed toward the sticky surface.

3. A roach trap provided with a substantially flat and laterally extended receptacle for normally sticky material, and a substantially flat cover member therefor having passages through it for the admission of roaches, and provided with an imperforate zone related to the part of the receptacle designed to receive sticky adhesive material so as to provide an area of the sticky adhesive material underneath the imperforate portion of the cover for hiding bait in position to be substantially invisible from the exterior of the trap.

4. A roach trap provided with a substantially flat imperforate receptacle for normally sticky material, and a substantially flat cover member in overlying relation to the receptacle and provided with passages each with an interior marginal collar directed toward the receptacle for sticky material and spaced therefrom to cause an entering roach to become inverted in endeavoring to pass about the collar, whereby the roach then presents its back toward the sticky material in such close relation thereto as to be liable to be caught thereby.

5. A roach trap comprising a substantially flat and laterally extended imperforate receptacle designed to receive a sheet covered with normally sticky material, and a substantially flat and laterally extended sheet metal cover for the receptacle having passages therethrough and with an extended imperforate portion in the midst of the passages, each passage being bordered on the inner face of the cover with the collar having an uneven or jagged margin directed toward and so closely approaching the sticky material within the receptacle that an entering roach is liable to become caught by the sticky material while the roach is still clinging to the collar about the passage, and the imperforate portion of the cover constituting a hiding means for bait placed upon the sticky material.

In testimony that I claim the foregoing as my own, I have hereto affixed my signature in the presence of two witnesses.

SIMON C. JOHNSON.

Witnesses:
 E. H. LUNEY,
 A. C. HINDS.